S. O. WHITE.
CLUTCH.
APPLICATION FILED JUNE 3, 1920.
1,431,551.  Patented Oct. 10, 1922.
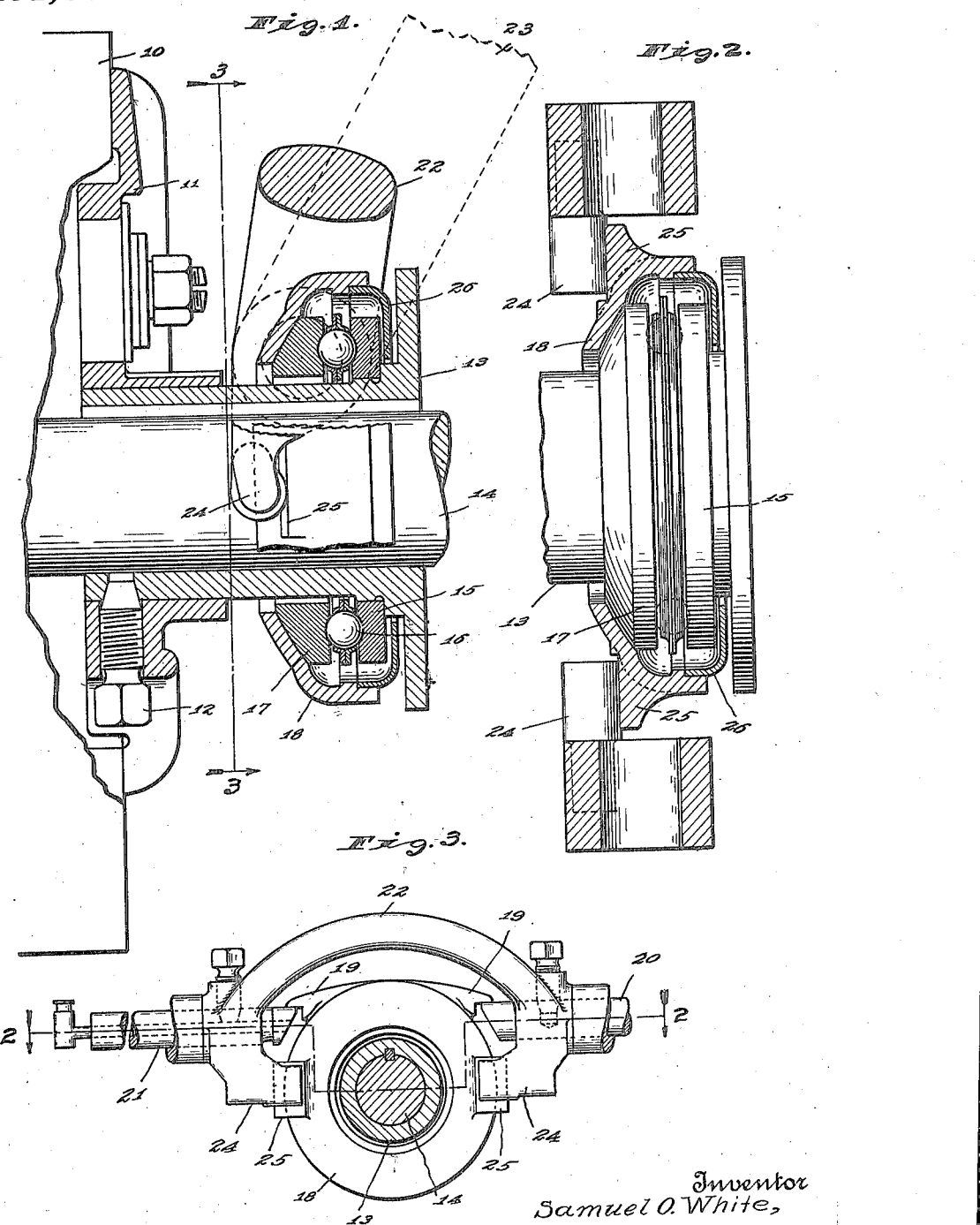

Patented Oct. 10, 1922.

1,431,551

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

CLUTCH.

Application filed June 3, 1920. Serial No. 386,310.

*To all whom it may concern:*

Be it known that I, SAMUEL O. WHITE, a citizen of the United States, residing at Muncie, in the county of Delaware and State of Indiana, have invented a new and useful Clutch, of which the following is a specification.

It is the object of my invention to produce a clutch mechanism, particularly for automobiles, wherein the movable clutch member is actuated through an effective thrust bearing with a self-alining mounting, so that the thrust bearing may always have its full effectiveness but may position itself in its mounting as required without affecting the parts of the bearing proper.

The accompanying drawing illustrates my invention. Fig. 1 is a fragmentary sectional view through a clutch-actuating mechanism embodying my invention; Fig. 2 is a horizontal section, substantially on the line 2—2 of Fig. 3, with the yoke shafts removed; and Fig. 3 is a transverse section, on a somewhat reduced scale, on the line 3—3 of Fig. 1.

The clutch 10 is indicated merely in outline, as it may be of any desired type, having a movable member 11 by the movements of which to the right and left (Fig. 1) the clutch is respectively released and set. The member 11 is fixed, as by a set screw 12, on a sleeve 13 splined on the transmission shaft 14 which is to be connected to and disconnected from the other part, such as the usual engine crank shaft, by the operation of the member 11.

The sleeve 13 is properly shouldered to receive one race 15 of a thrust ball-bearing, the balls 16 of which run between the end faces of such race 15 and the second race 17, which end faces are preferably grooved. The race 17 is clear of the sleeve 13, and is seated in a housing 18 which has projecting fingers 19 resting upon the adjacent ends of the two shaft parts 20 and 21 which carry and are interconnected by the clutch yoke 22 fixed thereto. The shaft 20 is suitably operated by the usual clutch pedal 23. The clutch yoke 22 has downwardly and inwardly projecting fingers 24 which bear against abutments 25 on the housing 18, preferably on each side thereof in the horizontal plane of the axis. The rear end of the housing 18 preferably receives a supplemental housing member 26, to enclose the parts and keep out the dust; but this is incidental.

The race 17 and the housing 18 fit upon each other on surfaces which are segments of spheres. Preferably these surfaces are convex on the race 17 and concave on the housing 18, as illustrated. This interfitting of the race and housing on these spherical surfaces makes the structure self-alining, and permits the two races 15 and 17 to adjust themselves relatively to each other and maintain themselves in proper parallelism for the proper production of the thrust action, regardless of any inaccuracies in construction or assembly, and regardless of the tilting movement which the housing may have as it is moved back and forth in the operation of the clutch.

In operation, the driver manipulates the clutch lever 23 in the usual way, to tilt the yoke 22, and the yoke acts through the fingers 24 on the abutments 25 to push the housing 18 rearward, while when the pedal is released the usual clutch spring produces the reverse movement. In its back and forth movement, the fingers 19 slide on the ends of the shafts 20 and 21, but if there is any tendency for the housing to swing, it may do so without affecting the parallelism of the races 15 and 17.

I claim:

1. In combination, a clutch-shifting sleeve, a thrust bearing comprising two races with balls between their adjacent faces, one of said races being carried by said sleeve, a housing free from the sleeve and in which the other race has a self-alining mounting, and means for supporting and shifting said housing.

2. In combination, a clutch-shifting sleeve, a thrust bearing comprising two co-axial parallel races with anti-friction devices between them, one of said races being mounted on said sleeve, a housing free from the sleeve and in which the other race has a self-alining mounting, and means for supporting said housing and shifting it axially.

3. In combination, a clutch-shifting sleeve, a thrust bearing comprising two races with balls between their adjacent faces, one of said races being carried by said sleeve, a housing in which said other race fits on curved surfaces whereby the housing and race may move relatively as required in order to maintain the two races in proper relative position, means independent of said sleeve for supporting said housing for longitudinal movement, and means for producing such longitudinal movement of said housing to shift said sleeve.

4. In combination, a clutch-shifting sleeve, a thrust bearing comprising two races with balls between their adjacent faces, one of said races being carried by said sleeve, a housing in which the other race is seated on co-operating spherical surfaces, means for supporting said housing above its center so that it can be moved longitudinally of said sleeve, and a swinging yoke having fingers for engaging said housing on either side of said sleeve below the point of support for said housing for shifting the housing to shift the sleeve.

5. In combination, a clutch-shifting sleeve, a thrust bearing comprising two races with balls between their adjacent faces, one of said races being carried by said sleeve, a housing in which the other race is seated on co-operating spherical surfaces, means for supporting said housing so that it can be moved longitudinally of said sleeve, and a swinging yoke having fingers for engaging said housing on either side of said sleeve for shifting the housing to shift the sleeve.

6. In combination, a clutch-shifting sleeve, a thrust bearing comprising two races with balls between their adjacent faces, one of said races being carried by said sleeve, a housing in which the other race is seated on co-operating spherical surfaces, means for slidingly supporting said housing so that it can be moved longitudinally of said sleeve, and a swinging yoke having fingers for engaging said housing on either side of said sleeve for shifting the housing to shift the sleeve.

In witness whereof, I have hereunto set my hand at Muncie, Indiana, this 29th day of May, A. D. one thousand nine hundred and twenty.

SAMUEL O. WHITE.